US009887046B2

(12) United States Patent
Li et al.

(10) Patent No.: US 9,887,046 B2
(45) Date of Patent: Feb. 6, 2018

(54) GRAPHENE COMPOSITES AND METHODS OF MAKING AND USING THE SAME

(71) Applicant: Jiangnan University, Wuxi, Jiangsu (CN)

(72) Inventors: Zaijun Li, Jiangsu (CN); Tao Yan, Jiangsu (CN); Xiulan Sun, Jiangsu (CN); Junkang Liu, Jiangsu (CN); Guangli Wang, Jiangsu (CN); Zhiguo Gu, Jiangsu (CN)

(73) Assignee: Jiangnan University, Jiangsu (CN)

( * ) Notice: Subject to any disclaimer, the term of this patent is extended or adjusted under 35 U.S.C. 154(b) by 44 days.

(21) Appl. No.: 14/758,210

(22) PCT Filed: Dec. 28, 2012

(86) PCT No.: PCT/CN2012/087877
§ 371 (c)(1),
(2) Date: Jun. 26, 2015

(87) PCT Pub. No.: WO2014/101128
PCT Pub. Date: Jul. 3, 2014

(65) Prior Publication Data
US 2015/0340171 A1 Nov. 26, 2015

(51) Int. Cl.
*H01B 1/04* (2006.01)
*C01B 31/04* (2006.01)
(Continued)

(52) U.S. Cl.
CPC ............ *H01G 11/38* (2013.01); *B01J 19/245* (2013.01); *C01B 32/192* (2017.08); *H01G 11/32* (2013.01);
(Continued)

(58) Field of Classification Search
CPC ............... H01B 1/02–1/04; H01B 1/24; C01B 31/02–31/04; C01B 31/0476; C01B 32/192; C01B 32/198
(Continued)

(56) References Cited

U.S. PATENT DOCUMENTS 7,910,199 B1  3/2011  Gross et al.
7,986,509 B2  7/2011  Seymour
(Continued)

FOREIGN PATENT DOCUMENTS

CN    102509640 A  *  6/2012  ............ Y02E 60/13
CN    102745675 A     10/2012

OTHER PUBLICATIONS

Hong ("Hollow Capsules of Reduced Graphene Oxide Nanosheets Assembled on a Sacrificial Colloidal Particle." The Journ. Phys. Chem. Let., 1, pp. 3442-3445, pub Nov. 22, 2010).*
(Continued)

*Primary Examiner* — Tri V Nguyen
(74) *Attorney, Agent, or Firm* — Dorsey & Whitney LLP

(57) ABSTRACT

An graphene composites have reduced graphene oxide and a layered double-hydroxide distributed on the reduced graphene oxide. The composites may also include nanopores formed within the reduced graphene oxide and micropores that may be formed by the reduced graphene oxide. The composites may exhibit superior electrical and/or absorbent properties. Capacitor devices and electrodes containing the composites are also disclosed, as well as methods and systems configured to make and use the composites.

17 Claims, 8 Drawing Sheets

(51) Int. Cl.
  *H01G 11/38* (2013.01)
  *B01J 19/24* (2006.01)
  *H01G 11/32* (2013.01)
  *H01G 11/86* (2013.01)
  *C01B 32/192* (2017.01)

(52) U.S. Cl.
  CPC ..... *H01G 11/86* (2013.01); *B01J 2219/00103* (2013.01); *B01J 2219/24* (2013.01); *Y02E 60/13* (2013.01)

(58) Field of Classification Search
  USPC .......... 252/500–519.1; 423/445 R–448, 460; 429/231.8
  See application file for complete search history.

(56) References Cited

U.S. PATENT DOCUMENTS

| | | | |
|---|---|---|---|
| 8,611,070 B2* | 12/2013 | Ivanovici | B82Y 30/00 361/502 |
| 2011/0281176 A1 | 11/2011 | Seymour | |
| 2011/0284805 A1 | 11/2011 | Samulski et al. | |
| 2015/0085424 A1* | 3/2015 | Ozyilmaz | H01G 11/38 361/502 |

OTHER PUBLICATIONS

Yan ("Advanced Asymmetric Supercapacitors Based on Ni(OH) 2 / Graphene and Porous Graphene Electrodes with High Energy Density." Adv Funct Mater, 22, pp. 2632-2641, 2012).*

Li ("Processable aqueous dispersions of graphene nanosheets." Nature Nanotech, 3, pp. 101-105, Feb. 2008).*

Huang ("Functional Nanoporous Graphene Foams with Controlled Pore Sizes." Adv Mater., 24, pp. 4419-4423, Jul. 12, 2012).*

Zhang ("Highly Conductive and Porous Activated Reduced Graphene Oxide Films for High-Power Supercapacitors." NanoLet, 12, pp. 1806-1812, pub Feb. 28, 2012).*

Li ("Fabrication of a hybrid graphene/layered double hydroxide material." Carbon, 48, pp. 4391-4396, Online Aug. 5, 2010).*

Latorre-Sanchez ("The synthesis of a hybrid graphene-nickel/manganese mixed oxide and its performance in lithium-ion batteries." Carbon, 50, pp. 518-525, 2012).*

Xu ("Dispersion and Size Control of Layered Double Hydroxide Nanoparticles in Aqueous Solutions." JPC B, 110, pp. 16923-16929, 2006).*

Choi, B.G., et al., "3D Macroporous Graphene Frameworks for Supercapacitors with High Energy and Power Densities," ACM Nano, vol. 6, No. 5, pp. 4020-4028 (2012).

Gao, Z., et al., "Graphene Nanosheet/Ni2+/Al3+ Layered Double-Hydroxide Composite as a Novel Electrode for a Supercapacitor," Chemistry of Materials, vol. 23, No. 15, pp. 3509-3516, American Chemical Society (2011).

Niu, Y.L., et al., "Synthesis and Electrochemical Property of Graphene/Co-Ni Double Hydroxides Composites," Chinese Journal of Inorganic Chemistry, vol. 28, No. 9, pp. 1879-1880 (Sep. 2012) with English language abstract.

International Search Report and Written Opinion from International Application No. PCT/CN2012/087877 dated Oct. 17, 2013.

* cited by examiner

GRAPHENE COMPOSITES AND METHODS OF MAKING AND USING THE SAME

CROSS-REFERENCE TO RELATED APPLICATION

This application is the U.S. National Phase entry application under 35 U.S.C. § 371 of PCT/CN2012/087877 filed on Dec. 28, 2012, the entire disclosure of which is hereby incorporated by reference herein.

BACKGROUND

Unless otherwise indicated herein, the materials described in this section are not prior art to the claims in this application and are not admitted to be prior art by inclusion in this section.

A capacitor is an electrical device that can store energy in the electric field between a pair of closely spaced conductors. When voltage is applied to the capacitor, electrical charges of equal magnitude, but opposite polarity, build up on each plate. The capacitance value of a capacitor is generally determined as proportional to the surface area of the parallel plates.

A supercapacitor (or ultracapacitor) can be an electrochemical double-layer capacitor that usually has high capacitance value when compared to common capacitors. This high capacitance value may be derived from using conductive materials of very high specific surface area. Most conventional supercapacitors use active carbon fiber cloth, active carbon particles or carbon fibers as electrode materials. These carbon materials are used because they have high theoretical specific surface area. With such high capacitance values, supercapacitors can be used as energy storage devices. Because supercapacitors typically have much less internal resistance than batteries, they are particularly suitable for providing transient power, for example providing a cold-cranking pulse power in electrical vehicles.

SUMMARY

Some embodiments disclosed herein may describe methods of making a graphene composite. Example methods may include: dispersing graphene oxide, particles and a reductive agent in a first solution; reacting the graphene oxide in the first solution with the reductive agent in the first solution to obtain a first composition comprising reduced graphene oxide and particles; reacting a chemical activation agent with the reduced graphene oxide in the composition; removing at least a portion of the particles from the composition to obtain a second composition; heating the second composition under a reductive atmosphere to obtain a third composition; combining the third composition, a first salt comprising a divalent cation, and/or a second salt comprising a trivalent cation in a second solution; and heating the second solution under solvothermal conditions sufficient to obtain the graphene composite.

Some embodiments disclosed herein may describe graphene composites. Example graphene composites may include reduced graphene oxide and/or a layered double-hydroxide distributed on surfaces of the reduced graphene oxide, where the reduced graphene oxide has a porous structure with an average pore size of less than about 2 nm.

Some embodiments disclosed herein may describe graphene composite capacitor devices. Example capacitor devices may include: a first electrode having reduced graphene oxide and a layered double-hydroxide distributed on surfaces of the reduced graphene oxide, where the reduced graphene oxide has a porous structure with an average pore size of less than about 2 nm; a second electrode; and/or an electrolyte disposed between the first electrode and the second electrode.

Some embodiments disclosed herein may describe systems for making a graphene composite. Example systems may include: a first reaction chamber configured to react a reductive agent with graphene oxide, where the reductive agent and graphene oxide are dispersed in a first solution comprising particles; a second reaction chamber configured to react a chemical activation agent with the reduced graphene oxide; a solvent applicator configured to apply a solvent to the reduced graphene oxide and the particles, where the solvent is configured to dissolve the particles; a heating device configured to heat the reduced graphene oxide under a reducing atmosphere; and/or a third reaction chamber configured to heat a second solution under solvothermal conditions, where the solution comprises the reduced graphene oxide, a first salt comprising a divalent cation, and a second salt comprising a trivalent cation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
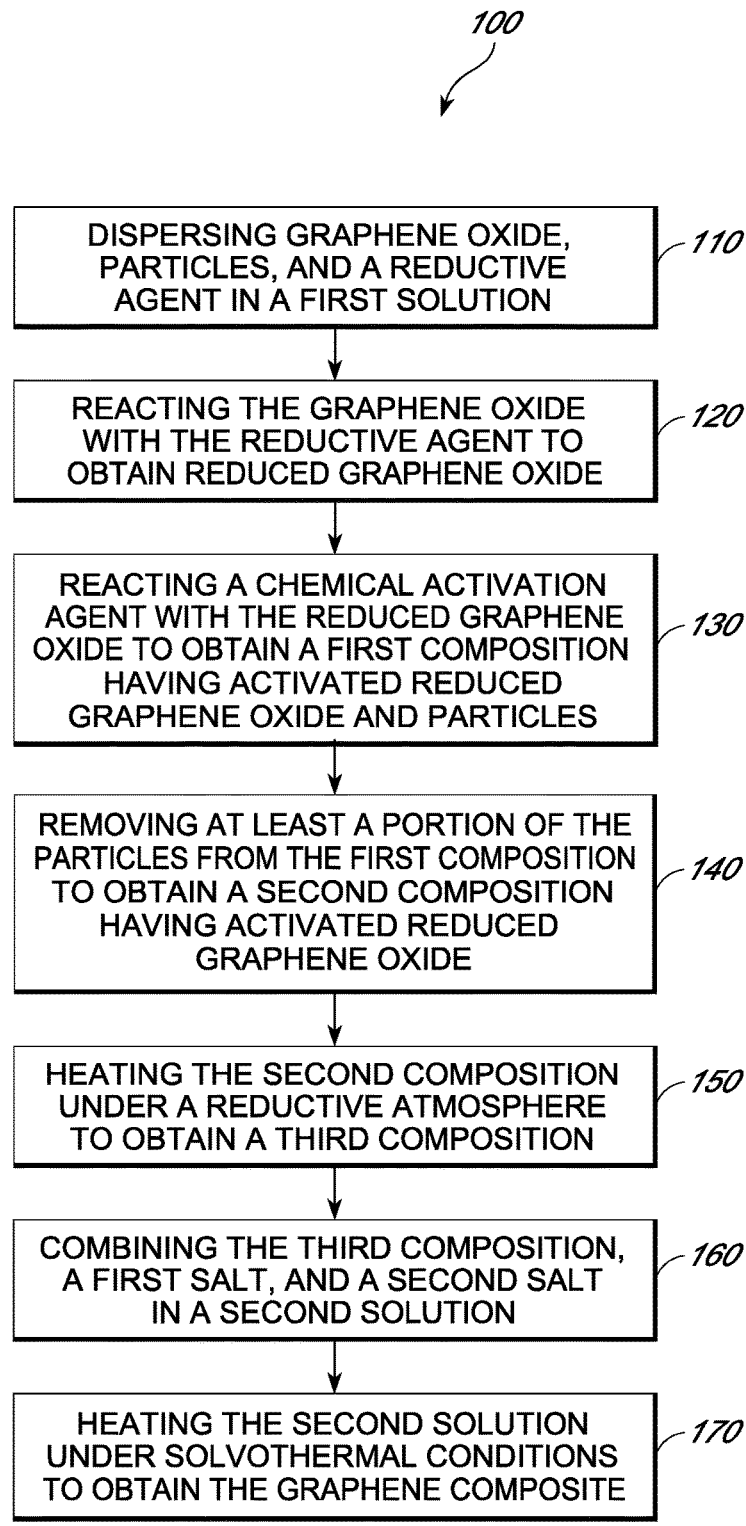
FIG. 1 is a flow diagram illustrating one example of a method of making a graphene composite in accordance with the least some examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Briefly stated, the present disclosure generally describes techniques relating to graphene composites having reduced graphene oxide and a layered double-hydroxide distributed on the reduced graphene oxide. The composites may also include nanopores formed within the reduced graphene oxide and micropores that may be formed by the reduced graphene oxide. The composites may exhibit superior electrical and/or absorbent properties. Capacitor devices and electrodes containing the composites are also disclosed, as well as methods and systems configured to make and use the composites.

Some embodiments disclosed herein include a method of making a graphene composite. FIG. 1 is a flow diagram illustrating one example of method 100 of making a graphene composite in accordance with at least some examples of the present disclosure. As illustrated in FIG. 1, method 100 may include one or more functions, operations, or actions as illustrated by one or more of operations 110-170.

Processing for 100 may begin at operation 110, "Dispersing graphene oxide, particles, and a reductive agent in a first solution." Operation 110 may be followed by operation 120, "Reacting the graphene oxide with the reductive agent to obtain reduced graphene oxide." Operation 120 may be followed by operation 130, "Reacting a chemical activation agent with the reduced graphene oxide to obtain a first composition having activated reduced graphene oxide and the particles." Operation 130 may be followed by operation 140, "Removing at least a portion of the particles from the first composition to obtain a second composition having activated reduced graphene oxide." Operation 140 may be followed by operation 150, "Heating the second composition under a reductive atmosphere to obtain a third composition." Operation 150 may be followed by operation 160, "Combining the third composition, a first salt, and a second salt in a second solution." Operation 160 may be followed by operation 170, "Heating the second solution under solvothermal conditions to obtain the graphene composite."

In FIG. 1, operations 110-170 are illustrated as being performed sequentially with operation 110 first and operation 170 last. It will be appreciated however that these operations may be reordered, combined, and/or divided into additional or different operations as appropriate to suit particular embodiments. In some embodiments, additional operations may be added. In some embodiments, one or more of the operations can be performed at about the same time.

At operation 110, "Dispersing 110, the graphene oxide, particles, and a reductive agent can be combined in the first solution using standard techniques. Some example techniques for dispersing or combining into solution form may include, for example, ultrasonicating or high-shear mixing the solution for a sufficient time period. As an example, graphene oxide and polypropylene microspheres can be dispersed in deionized water by ultrasonicating for about six hours. Ammonia and hydrazine may be subsequently added to the mixture.

The graphene oxide for dispersing in the first solution is not particularly limited, and may be obtained by a variety of methods. In some embodiments, the graphene oxide may be formed using a Hummers or modified Hummers process to oxidize graphite. For example, graphite can be treated using a mixture of sulfuric acid, sodium nitrate, and potassium permanganate to obtain the graphene oxide. Other methods of forming the graphene oxide may also be utilized. In some embodiments, the graphene oxide can be sufficiently oxidized so that the graphene oxide can be dispersed in a polar solvent (e.g., water) at a concentration of at least about 0.01 mg/mL. In some embodiments, the graphene oxide may be sufficiently oxidized so that it may be dispersed in a polar solvent (e.g., water) at a concentration of at least about 0.1 mg/mL.

The amount of graphene oxide dispersed in the first solution may vary depending upon numerous factors, such as the solvent and the reductive agent. The amount of graphene oxide dispersed in the first solution can be, for example, at least about 0.01 mg/mL, at least about 0.05 mg/mL, at least about 0.1 mg/mL, at least about 0.25 mg/mL, or at least about 0.5 mg/mL. The amount of graphene oxide dispersed in the first solution can be, for example, less than or equal to about 5 mg/mL, less than or equal to about 2 mg/mL, less than or equal to about 1 mg/mL, less than or equal to about 0.8 mg/mL, or less than or equal to about 0.5 mg/L. In some embodiments, the amount of graphene oxide dispersed in the first solution may be in a first range of about 0.01 mg/mL to about 5 mg/mL, or in a second range of about 0.1 mg/mL to about 1 mg/mL.

The particles utilized in operation 110 are also not particularly limited, and various commercially available particles may be used. In some embodiments, the particles may include a material that can be dissolved in a solvent in which reduced graphene oxide is generally immiscible. Non-limiting examples of suitable materials for the particles may include a polyolefin, a polystyrene, an acrylic, silica, or a mixture thereof. In some embodiments, the particles can include a polymer. In some embodiments, the particles can include a polymer that can be dissolved in a solvent having tetrahydrofuran, toluene, or a mixture thereof. The particles may, in some embodiments, have a negative charge. For example, negatively charged groups (e.g., carboxylic acid-containing groups) can be coupled to the surface of the particles. As another example, the particles may include a polymer with monomer units that have a negative charge.

The size of the particles is also not very limited. The skilled artisan, guided by the teachings of the present application, will appreciate that the size of the particles can control the morphology of the final graphene composite. For example, larger particles may be utilized to yield larger micropores in the graphene composite. The particles may, for example, have an average largest dimension of at least about 250 nm, at least about 500 nm, at least about 750 nm, or at least about 1 μm. The particles may, for example, have an average largest dimension of less than or equal to about 10 μm, less than or equal to about 5 μm, less than or equal to about 3 μm, or less than or equal to about 1.2 μm. In some embodiments, the particles have an average largest dimension in a first range of about 250 nm to about 10 μm, or in a second range of about 500 nm to about 1.2 μm.

In some examples, the aspect ratio of the particles may be utilized to control the morphology of the final graphene composite. For example, the particles may have a largest aspect ratio of no more than about 50, no more than about 10, no more than about 5, no more than about 2, or no more than about 1.5. In some embodiments, the aspect ratio of the particles may result in particles with a shape that is generally spherical or generally ellipsoidal.

The reductive agent may be any element or compound that can be utilized to react with the graphene oxide to obtain a reduced graphene oxide. Non-limiting examples of suitable reductive agents may include hydrazine hydrate, sodium borohydrate, or a mixture thereof. The amount of the reductive agent in the first solution can be selected as an amount that is effective for reducing the graphene oxide into reduced graphene oxide. In some embodiments, the amount of reductive agent in the first solution is at least about 0.001% by volume, or at least about 0.01% by volume.

The first solution can generally include any solvent that can adequately disperse the graphene oxide and the reductive agent at conditions effective for the reductive agent to reduce the graphene oxide. Accordingly, the solvent may vary depending upon the selected reductive agent and degree of oxidation for the graphene oxide. In some embodiments, the first solution includes a polar solvent. In some embodiments, the first solution includes a polar protic solvent. As an example, the first solution can include water, an alcohol, or a combination thereof.

The relative amount of the graphene oxide and the particles may be varied, for example, depending on the desired morphology of the final reduced graphene oxide composite. For example, the amount of particles may correspond to a density of micropores in the final composite. The weight ratio of the graphene oxide to the particles can be, for example, at least about 1:1, at least about 1:3, at least about 1:5, or at least about 1:8. The weight ratio of the graphene oxide to the particles can be, for example, less than or equal to about 1:50, less than or equal to about 1:10, less than or equal to about 1:8, less than or equal to about 1:5, or less than or equal to about 1:3. In some embodiments, the weight ratio of the graphene oxide to the particles is in a first range of about 1:1 to about 1:50, or in a second range of about 1:3 to about 1:10.

Returning to FIG. 1, at operation 120 "Reacting the graphene oxide with the reductive agent to obtain reduced graphene oxide", the graphene oxide and the reductive agent may react while dispersed in the first solution. This operation may include, for example, maintaining the first solution under conditions that are effective for the reductive agent to reduce the graphene oxide. For example, the first solution may be maintained at a suitable temperature over a time interval that is sufficient for the reaction to proceed. In some embodiments, the first solution may be heated under reflux to obtain the reduced graphene oxide. In some embodiments, the first solution may be heated at a temperature in a range of about 90° C. to about 100° C. to obtain the reduced graphene oxide. As an example, the first solution may be maintained at a suitable temperature (e.g., about 100° C.) over a time interval in a range of about 1 hour to about 6 hours to obtain reduced graphene oxide. Although various non-limiting examples of suitable conditions are disclosed in the present application, the skilled artisan, guided by the teachings of the present application, will appreciate that numerous other conditions may be suitable depending upon various properties of the first solution (e.g., the selected reductive agent or solvent).

The reduced graphene oxide and particles may be optionally isolated from the first solution before proceeding to additional operations in the method (e.g., before proceeding to operation 130 as depicted in FIG. 1). For example, the graphene oxide and particles may be filtered or precipitated from the first solution using standard techniques. The reduced graphene oxide and particles may also be optionally washed and/or optionally dried before proceeding to additional operations in the method. As a specific example, the reduced graphene oxide and particles can be filtered from the first solution, washed with deionized water and ethanol successively, and then dried under vacuum before proceeding.

At operation 130 "Reacting a chemical activation agent with the reduced graphene oxide to obtain a first composition having activated reduced graphene oxide and the particles", a chemical activation agent may be used to increase the surface area of the reduced graphene oxide. The chemical activation agent may, for example, introduce nanopores into the reduced graphene oxide that increase the surface area. Various chemical activation agents are known in the art for increasing the surface area of carbonaceous materials, and any of these known chemical activation agents may be used. Non-limiting examples of suitable chemical activation agents include LiOH, NaOH, KOH, $Ca(OH)_2$, $Sr(OH)_2$ or $Ba(OH)_2$. In some embodiments, the chemical activation agent is an alkali metal salt containing a hydroxide, or an alkaline earth metal salt containing a hydroxide.

As an example, the particles and reduced graphene oxide can be dispersed in an aqueous solution containing the chemical activation agent. The particles and reduced graphene oxide can be maintained in the solution for a sufficient amount of time to obtain a desired increase in surface area. For example, the particles and graphene oxide can be maintained in the solution for about 24 hours at room temperature. The amount of the chemical activation agent in the solution is not particularly limited, and may be, for example, at least about 0.1 mol/L, at least about 1 mol/L, or at least about 5 mol/L.

The activated reduced graphene oxide and particles may be optionally isolated from a solution after reacting the reduced graphene oxide with the chemical activation agent (e.g., before proceeding to operation 140 as depicted in FIG. 1). For example, the activated reduced graphene oxide and particles may be filtered or precipitated from the solution using standard techniques. The activated reduced graphene oxide and particles may also be optionally washed and/or optionally dried before proceeding to additional operations in the method. As a specific example, the activated reduced graphene oxide and particles can be filtered from the solution, washed with deionized water, and then dried under vacuum before proceeding to the next operation.

At operation 140 "Removing at least a portion of the particles from the first composition to obtain a second composition having activated reduced graphene oxide", the particles can be removed from the composition containing the activated reduced graphene oxide to produce micropores in the activated reduced graphene oxide. In other words, the particles may function as a sacrificial material that is removed to produce micron-sized voids in the activated reduced graphene oxide. Generally, the particles can be removed using any technique that will maintain about the same morphology for the activated reduced graphene oxide after removal. In some embodiments, the particles can be dissolved in a solvent to remove them from the composition. The solvent can be selected so that the particles are soluble in the solvent, while the reduced graphene oxide is generally immiscible in the solvent. As an example, polypropylene particles can be removed by washing with toluene.

The amount particles removed from the composition by weight can be, for example, at least about 50%, at least about 70%, at least about 90%, at least about 95%, at least about 98%, or at least about 99%. In some embodiments, substantially all of the particles can be removed from the first composition.

At operation 150 "Heating the second composition under a reductive atmosphere to obtain a third composition", the activated reduced graphene oxide can be heated under conditions that further reduce the graphene oxide. Without being bound to any particular theory, it is believed that reacting graphene oxide with the reductive agent (e.g., operation 120 as shown in FIG. 1) may result in an incomplete reaction where the reduced graphene oxide may include various oxidized carbon atoms (e.g., carbon atoms bonded to epoxy groups, hydroxyl groups or carboxyl groups). Accordingly, heating the activated reduced graphene oxide under a reductive atmosphere may further remove at least a portion of the remaining oxidized carbon atoms to yield an activated reduced graphene oxide with improved properties (e.g., electrical and absorbent properties).

The activated reduced graphene oxide can, in some embodiments, be heated at a temperature in a first temperature range of about 600° C. to about 1400° C., or in a second temperature range of about 800° C. to about 1200° C. As one example, the heating may be over a time interval in a range of about 30 minutes to about 5 hours, or over another time interval in a range of about 1 hour to about 3 hours. The reductive atmosphere can include gases such as a mixture of $H_2$ and an inert gas, such as Ar. The volume ratio of the inert gas and $H_2$ may be in a first range of about 1:5 to about 10:1, or in a second range of about 1:1 to about 3:1. As a specific example, the activated reduced graphene oxide may be heated in a furnace at about 800° C. for about 1 hour in a reductive atmosphere of $Ar/H_2$ (3:1 by vol.).

At operation 160 "Combining the third composition, a first salt, and a second salt in a second solution", a solution can be prepared for forming a layered double-hydroxide on surfaces of the reduced graphene oxide. The first salt and the second salt may be selected to include cations that can be incorporated into the layered double-hydroxide. The first salt may include a divalent cation, while the second salt may include a trivalent cation. In some embodiments, the first salt has a divalent cation, where the divalent cation is one or more of $Mg^{2+}$, $Zn^{2+}$, $Ni^{2+}$, $Cu^{2+}$, $Co^{2+}$, $Mn^{2-}$, $Ca^{2+}$, or $Fe^{2-}$. In some embodiments, the second salt has a trivalent cation, where the trivalent cation is one or more of $Al^{3+}$, $Cr^{3+}$, $Co^{3+}$, $Fe^{3+}$, $Mn^{3+}$, $Ga^{3+}$, $Ce^{3+}$, or $La^{3-}$. In some embodiments, the first salt comprises $Ni^{2+}$, and the second salt comprises $Al^{3+}$. The anions in the first and second salts are not particularly limited, and may be organic or inorganic counterions. Generally, any anion that rapidly decomposes under solvothermal conditions can be used. For example, each of the first salt and the second salt can be one or more of a nitrate or a sulfate. The anion in the first salt can be the same or different than the anion in the second salt. In some embodiments, the first salt is $Ni(NO_3)_2$ and the second salt is $Al(NO_3)_3$.

The relative amount of the first salt and the second salt can be varied to adjust the composition of the layered double-hydroxide. The molar ratio of the divalent cation in the first salt relative to the trivalent cation in the second salt can be, for example, at least about 1:3, at least about 1:2, at least about 1:1, or at least about 2:1. The molar ratio of the divalent cation in the first salt relative to the trivalent cation in the second salt can be, for example, less than or equal to about 3:1, less than or equal to about 2:1, less than or equal to about 1:1, or less than or equal to about 1:2. In some embodiments, the molar ratio of the divalent cation in the first salt relative to the trivalent cation in the second salt is a first ratio in a first range of about 1:3 to about 3:1, or a second ratio in a second range of about 1:2 to about 2:1.

Similarly, the relative amount of the reduced graphene oxide to a combined amount of the first salt and the second salt can be varied to adjust the final composition. The weight ratio of the reduced graphene oxide to a combined weight of the first salt and the second salt can be, for example, at least about 1:100, at least about 1:80, at least about 1:50, or at least about 1:20. The weight ratio of the reduced graphene oxide to a combined weight of the first salt and the second salt can be, for example, less than or equal to about 1:10, less than or equal to about 1:20, less than or equal to about 1:50, or less than or equal to about 1:80. In some embodiments, the weight ratio of the reduced graphene side to a combined weight of the first salt and the second salt is in a range of about 1:100 to about 1:10, or in a range of about 1:20 to about 1:80.

The solvent in the second solution can include a polar protic solvent, such as water or an alcohol (e.g., methanol, ethanol, propanol, isopropanol, butanol, t-butyl alcohol, etc.). In some embodiments, the solvent in the second solution includes water and alcohol, such as ethanol. As a specific example, the second solution may include about 95% by volume ethanol and about 5% by volume water. The second solution may also include one or more additives to modulate the pH of the second solution, such as urea. The amount of activated reduced graphene oxide in the second solution can be, for example, at least about 0.01 mg/mL, at least about 0.1 mg/mL, at least about 0.3 mg/mL, or at least about 0.5 mg/mL. The amount of activated reduced graphene oxide in the second solution can be, less than or equal to about 5 mg/mL, less than or equal to about 1 mg/mL, or less than or equal to about 0.8 g/mL. In some embodiments, the amount of activated reduced graphene oxide in the second solution is in a first range of about 0.01 mg/mL to about 5 mg/mL, or in a second range of about 0.1 mg/mL to about 1 mg/mL.

At operation 170 "Heating the second solution under solvothermal conditions to obtain the graphene composite", the second solution can be heated under conditions that are effective to obtain a layered double-hydroxide. Generally, the process may include heating the second solution above a nominal boiling point to obtain a high temperature and a high pressure (e.g., more than about 1 atm) to facilitate forming the layered double-hydroxide.

As used herein, the "nominal boiling point" generally refers to the temperature at which a liquid medium exhibits a phase change to a gas at 1 atm pressure. For example, the nominal boiling point of water is about 100° C.

The second solution may be heated in a sealed chamber at a temperature that is effective to form the layered double-hydroxide. The second solution can be heated in the sealed chamber at a temperature of, for example, at least about 100° C.; at least about 125° C.; at least about 150° C.; at least about 200° C.; at least about 250° C.; or at least about 300° C. The second solution can be heated in the sealed chamber at a temperature of, for example, less than or equal to about 500° C.; less than or equal to about 400° C.; less than or equal to about 300° C.; or less than or equal to about 200° C. In some embodiments, the second solution can be heated in the sealed chamber at a temperature in a first range of about 100° C. to about 500° C., or in a second range of about 100° C. to about 200° C.

The second solution may also be heated for a time period that is effective to form the composite. The second solution can be heated for a time period of, for example, at least about 30 minutes; at least about 1 hour; at least about 4 hours; at least about 12 hours; or at least about 24 hours. The second solution can be heated for a time period of, for example, less than or equal to about 100 hours; less than or equal to about 48 hours; less than or equal to about 24 hours; or less than or equal to about 12 hours. In some embodiments, the second solution can be heated for a time period in a first range of about 30 minutes to about 100 hours, or in a second range of about 4 hours to about 24 hours.

Heating the second solution in the sealed chamber can also produce an increased pressure. The pressure in the sealed chamber while heating the second solution may reach, for example, more than 1 atm, at least about 1.2 atm, at least about 1.5 atm, or at least about 2 atm.

The sealed chamber is not particularly limited and may generally be any inert container that withstands the temperatures and pressures applied during the process. As a non-limiting example, the sealed chamber may be an autoclave that is heated in a furnace or oven. The volume of the sealed chamber filled with the second solution may also vary. For example, the sealed chamber may be half-filled with the second solution. The amount of the second solution in the sealed chamber by volume relative to a total volume of the sealed chamber may be, for example, at least about 10%, at least about 20%, at least about 40%, at least about 50%, or at least about 60%.

The resulting graphene composite may be optionally isolated from the second solution after heating under solvothermal conditions (e.g., after operation 170 as depicted in FIG. 1). For example, the resulting composite may be filtered or precipitated from the second solution using standard techniques. The resulting composite may also be optionally washed and/or optionally dried before proceeding to additional operations in the method. As a specific example, the resulting composite can be filtered from the second solution.

The resulting composite may be used, for example, to prepare a capacitor or an electrode that can be implemented in the capacitor. In some embodiments, the graphene composite can be combined with a binding medium and a conductive agent. Non-limiting examples of suitable binding mediums include polytetrafluoroethylene, a plastic, stainless steel, glass, or a ceramic. Non-limiting examples of suitable conductive agents include acetylene black, polyaniline, polyoxyphenylene, polyphenylene sulfide, polythiophene, polyfuran, polypyrrole, polymethylpyrrole, polycarbozole, or polyazulene. As a specific example, the resulting composite can be mixed with acetylene black and polytetrafluoroethylene. The amount of the resulting composite relative by weight to the amount of the binding medium by weight can be, for example, at least about 20:1, at least about 10:1, or at least about 1:1. The amount of the resulting composite by weight relative to the amount of the conductive agent by weight can be, for example, at least about 20:1, at least about 10:1, or at least about 1:1. This mixture may be applied to a porous conductive material (e.g., a nickel foam) to form an electrode. The resulting composite may, for example, have a specific capacitance of at least about 800 F/g at 1 A/g, at least about 1200 F/g at 1 A/g, or at least about 1400 F/g at 1 A/g. The resulting composite may, for example, have a specific capacitance of at least about 400 F/g at 50 A/g, at least about 600 F/g at 50 A/g, or at least about 800 F/g at 50 A/g.

Some embodiments disclosed herein include a graphene oxide composite having reduced graphene oxide and a layered double-hydroxide distributed on surfaces of the reduced graphene oxide. The composite may be formed, in some embodiments, using the methods disclosed in the present application. For example, the composite may be formed by the method depicted in FIG. 1. The composition may, for example, exhibit superior electrical and/or absorbent properties.

Figure 2:
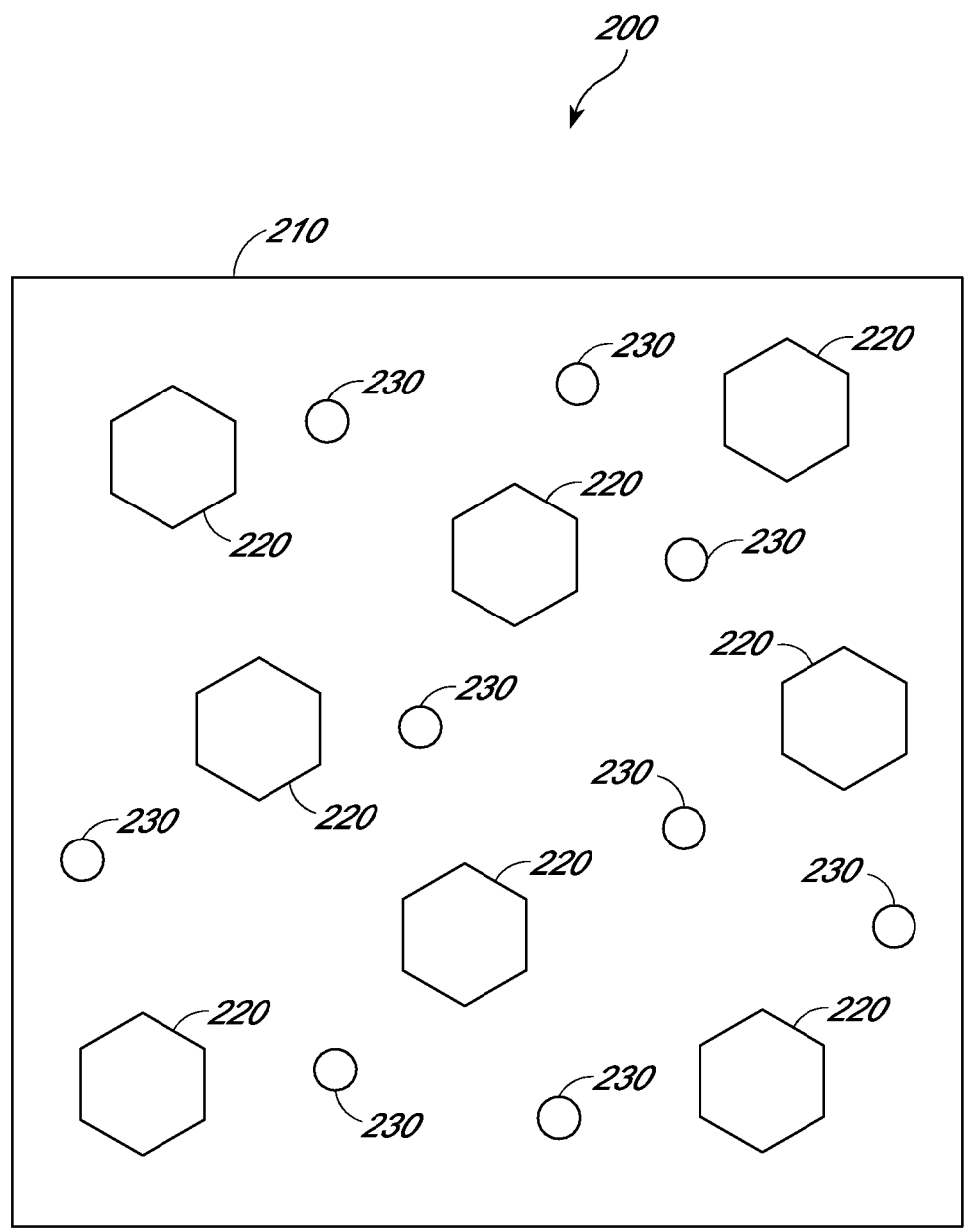
FIG. 2 shows one example of a layered double-hydroxide distributed on a surface of a reduced graphene oxide sheet in accordance with the least some examples of the composition in the present disclosure.

FIG. 2 shows one example of composite 200 having of a layered double-hydroxide distributed on a surface of a reduced graphene oxide sheet in accordance with the least some examples of the composition in the present disclosure. Reduced graphene oxide sheet 210 has layered double-hydroxides 220 distributed on the surface of reduced graphene oxide sheet 210. Layered double-hydroxides 220 may be formed on reduced graphene oxide sheet 210 by, for example, a solvothermal process such as in operation 170 as depicted in FIG. 1. Reduced graphene oxide sheet 210 also includes nanopores 230, which can be distributed on the surface. Nanopores 230 may be formed on reduced graphene oxide sheet 210 by, for example, reacting reduced graphene oxide with a chemical activation agent (e.g., at operation 130 as depicted in FIG. 1). Nanopores 230 may increase the surface area of reduced graphene oxide sheet 210, which may improve the electrical and/or absorbent properties of the composition. The nanopores may have a width of less than about 5 nm or less than about 2 nm.

Although FIG. 2 shows a single reduced graphene oxide sheet, the skilled artisan, guided by the teachings of the present application, will appreciate that the composite can include numerous graphene oxide sheets. The reduced graphene oxide sheets may also be configured to form micropores in the composition. For example, the micropores may be formed by removing sacrificial particles (e.g., at operation 140 as depicted in FIG. 1).

The micropores may, for example, have an average size of at least about 250 nm, at least about 500 nm, at least about 750 nm, or at least about 1 μm. The micropores may, for example, have an average size of less than or equal to about 10 μm, less than or equal to about 5 μm, less than or equal to about 3 μm, or less than or equal to about 1.2 μm. In some embodiments, the micropores have an average size in a first range of about 250 nm to about 10 μm, or in a second range of about 500 nm to about 1.2 μm. The size of the micropores may, in some embodiments, correspond to the size of sacrificial particles used in a process for making the composition (e.g., the process depicted in FIG. 1).

The reduced graphene oxide may, in some embodiments, have a porous structure with an average pore size of less than about 2 nm. In some embodiments, the reduced graphene oxide has a pore structure with an average pore size in a range of about 1 nm to about 2 nm. The average pore size may be determined by standard gas absorption and desorption techniques, such as the Barret, Joyner and Halender (BJH) method.

The average thickness of the layered double-hydroxide distributed on surfaces of the reduced graphene oxide may be about 10 nm or less. In some embodiments, the average thickness of the layered double-hydroxide distributed on surfaces of the reduced graphene oxide may be about 5 nm or less. The average thickness can be determined using standard microscopy techniques.

The composite may also have a high surface area. The surface area of the composition can be, for example, at least about 1000 $m^2/g$, at least about 2000 $m^2/g$, at least about 2500 $m^2/g$, or at least about 3000 $m^2/g$. The surface area may be determined by the Brunauer-Emmertt-Teller (BET) method.

The layered double-hydroxide (e.g., layered double-hydroxides 220 as depicted in FIG. 2) can be crystalline, semi-crystalline, or amorphous. In some embodiments, the layered double-hydroxide is crystalline or semi-crystalline.

The layered double-hydroxide may, in some embodiments, include $[M^{2+}_{1-x}M^{3+}_x(OH)_2][A^{n-}]_{x/n} \cdot yH_2O$, where $M^{2+}$ is a divalent cation, $M^{3+}$ is a trivalent cation, $A^{n-}$ is an anion, x is variable with a value greater than 0 and less than 1, and y is a variable with a value greater than or equal to 0. In some embodiments, $A^{n-}$ includes one or more of $NO_3^-$, $SO_4^{2-}$, $Cl^-$, or $CO_3^{2-}$. In some embodiments, $M^{2-}$ includes one or more of $Mg^{2+}$, $Zn^{2+}$, $Ni^{2+}$, $Cu^{2-}$, $Co^{2+}$, $Mn^{2+}$, $Ca^{2+}$, or $Fe^{2+}$. In some embodiments, $M^{3+}$ includes one or more of $Al^{3+}$, $Cr^{3+}$, $Co^{3+}$, $Fe^{3+}$, $Mn^{3+}$, $Ga^{3+}$, $Ce^{3+}$, or $La^{3-}$. In some embodiments, $M^{2+}$ includes $Ni^{2+}$ and $M^{3+}$ includes $Al^{3+}$. In some embodiments, $M^{2+}$ is $Ni^{2+}$ and $M^{3+}$ is $Al^{3+}$. In some embodiments, y has a value n in a range of about 1 to about 6. The variable x can have a value, for example, more than 0, at least about 0.2, at least about 0.4, at least about 0.6, or at least about 0.8. The variable x can have a value, for example, less than 1, less than or equal to about 0.8, less than or equal to about 0.6, less than or equal to about 0.4, or less than or equal to about 0.2. In some embodiments, x has a value in a first range of about 0.2 to about 0.8, or in a second range of about 0.4 to about 0.6.

The reduced graphene oxide may be highly reduced so that little or no oxidized carbon atoms (e.g., carbon atoms bonded to epoxy groups, hydroxyl groups or carboxyl groups) remain in the reduced graphene oxide. This may result in improved electrical and/or absorbent properties for the composition. The atomic ratio of carbon atoms to oxygen atoms in the reduced graphene oxide can be, for example, at least about 4:1, at least about 8:1, at least about 20:1, at least about 40:1, at least about 80:1, or at least about 200:1. In some embodiments, the reduced graphene oxide contains no more than trace amounts of oxygen atoms. The amount of oxygen atoms in the reduced graphene oxide may be determined, for example, using x-ray photoelectron spectroscopy (XPS) or fourier transform infrared spectroscopy (FTIR).

As discussed above, the composite may be combined with additional ingredients that may be suitable for forming an electrode in a capacitor device or some similar device. Thus, in some embodiments, the composite may include a binding medium. Non-limiting examples of binding mediums may include one or more of polytetrafluoroethylene, a plastic, stainless steel, glass, or a ceramic. In some embodiments, the composite includes a conductive agent. Non-limiting examples of conductive agents may include one or more of acetylene black, polyaniline, polyoxyphenylene, polyphenylene sulfide, polythiophene, polyfuran, polypyrrole, polymethylpyrrole, polycarbozole, or polyazulene. In some embodiments, the composite may include a binding medium and a conductive agent. The composite may also be applied as a coating to a porous conductive material, such as nickel foam.

Some embodiments disclosed herein include a graphene oxide capacitor device having a first electrode, a second electrode, and an electrolyte disposed between the first electrode and the second electrode. The first electrode may include reduced graphene oxide and a layered double-hydroxide distributed on surfaces of the reduced graphene oxide. For example, any of the compositions disclosed in the present application may be included in the first electrode. The device may, in some embodiments, exhibit superior capacitance properties.

The first electrode can be, for example, a nickel foam having the reduced graphene oxide and the layered double-hydroxide applied to the surface of the nickel foam. The reduced graphene oxide and the layered double-hydroxide may be applied in a mixture with a suitable binding medium (e.g., polytetrafluoroethylene) and conductive agent (e.g., acetylene black).

The second electrode may optionally be configured with the same materials as the first electrode. For example, both the first electrode and the second electrode can include nickel foam having the reduced graphene oxide, the layered double-hydroxide, the binding medium, and the conductive agent applied as a mixture to the nickel foam. In some embodiments, the first electrode and the second electrode have about the same shape and dimensions. Alternatively, the second electrode can have a different composition and/or configuration. For example, the second electrode can be a metal plate.

The electrolyte in the device is not particularly limited, and various electrolytes may be utilized. In some examples, the electrolyte can be an alkali (e.g., KOH), an acid (e.g., $H_2SO_4$), or other non-aqueous organic (e.g., acetonitrile) electrolyte materials. Without being bound to any particular theory, it is believed that the electrolyte impregnates the reduced graphene oxide composition to obtain a chemical double layer along the interface of the electrolyte and the electrodes.

The device may also include a separator disposed between the first electrode and the second electrode. The separator can be made of a porous material, such as a polymer, and can be configured to allow ions in the electrolyte to transport through the separator. Example separator materials can include a nonconductive porous material such as a polyester, a polyolefin, fiberglass, or other cellulosic materials. The separator material can typically be shaped in about the same shape and dimensions as either the first electrode and/or the second electrode. The separator may also be optionally corrugated or roughened to improve surface area.

Some embodiments disclosed herein may include an electrode having reduced graphene oxide and a layered double-hydroxide distributed on surfaces of the reduced graphene oxide. The electrode can generally have the same characteristics as those described above with regard to the device. For example, the electrode can be a nickel foam having the reduced graphene oxide, the layered double-hydroxide, the binding medium, and the conductive agent applied as a mixture to the nickel foam.

Figure 3:
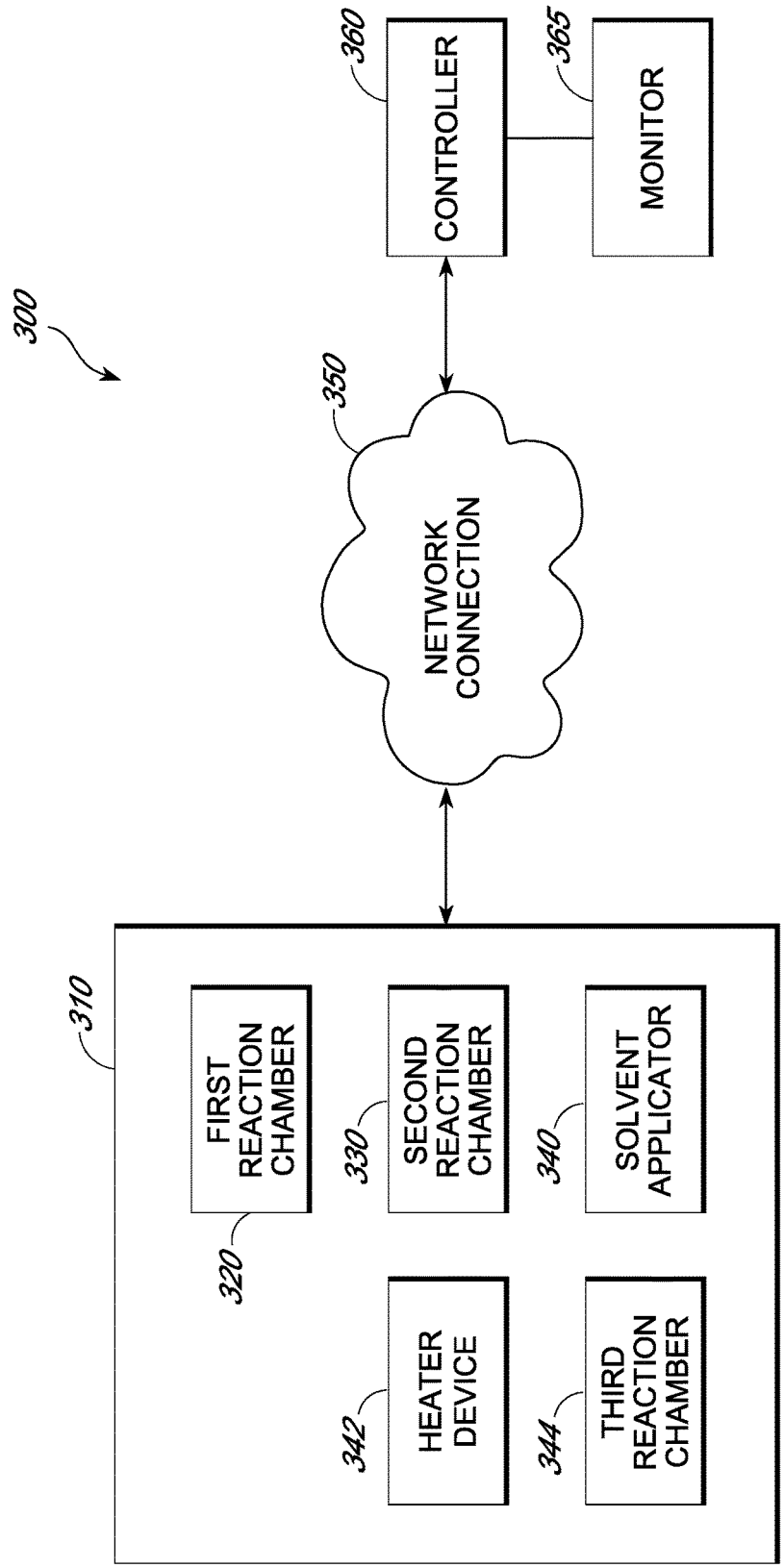
FIG. 3 is a block diagram illustrating one example of a system that is configured to control one or more operations in accordance with at least some examples of the present disclosure.

Some embodiments disclosed herein include a system for making a composition having reduced graphene oxide and a layered double-hydroxide distributed on surfaces of the reduced graphene oxide. FIG. 3 is a block diagram illustrating one example of a system that is configured to control one or more operations in accordance with at least some examples of the present disclosure. For example, equipment for performing operations for the flow diagram of FIG. 1 may be included in system 300.

System 300 may include a processing plant or facility 310 that is arranged in communication with a controller or processor 360. Processor or controller 360 may be the same or different controller as processor 410 described later with respect to FIGS. 4A-B. In some embodiments, processing plant or facility 310 may be adapted to communicate with controller 360 via a network connection 350. Network connection 350 may be a wireless connection or a wired connection or some combination thereof.

In some embodiments, controller 360 may be adapted to communicate operating instructions for various systems or devices in processing plant 310, which may include, for example, control of one or more operating conditions. Controller 360 may be configured to monitor or receive information from processing plant 310 and utilize the information as feedback to adjust one or more operating instructions communicated to processing plant 310.

In some embodiments, the operating conditions may be presented on a monitor or display 365 and a user may be configured to interact with a user interface (not shown) to adapt or adjust various aspects of the processing. Non-limiting examples of aspects of the process that may be presented on monitor or display 365 may include time, temperature, pressure, concentration of particles, concentration of graphene oxide, concentration of reduced graphene oxide, concentration of reductive agent, concentration of chemical activation agent, composition of reducing atmosphere, flow rate of reducing atmosphere, type of reductive agent, type of chemical activation agent, ranges or intervals related to the same, and the like. Monitor 365 may be in the form of a cathode ray tube, a flat panel screen such as an LED display or LCD display, or any other display device. The user interface may include a keyboard, mouse, joystick, write pen or other device such as a microphone, video camera or other user input device.

In some embodiments, processing facility 310 may include one or more of first reaction chamber 320, second reaction chamber 330, solvent applicator 340, heating device 342, and/or third reaction chamber 344. In some embodiments, first reaction chamber 320 may be configured via controller 360 to react a reductive agent with graphene oxide (e.g., as in operation 120 depicted in FIG. 1). First reaction chamber 320 may include one or more of a mixer, a temperature sensor, and heating or cooling element. Controller 360 may be configured to adjust the temperature in the reaction chamber (e.g., temperature set point or set points, temperature range, rate of change of temperature, etc.) to maintain conditions effective to react the reductive agent with the graphene oxide. In some embodiments, first reaction chamber 320 may be fluidly coupled to one or more reservoirs containing one or more of a reductive agent, a solvent, particles, or graphene oxide. Controller 360 may be configured to adjust valves to control an amount and/or rate of materials delivered from the one or more reservoirs into first reaction chamber 320.

Second reaction chamber 330 may be configured via controller 360 to react a chemical activation agent with reduced graphene oxide (e.g., as in operation 130 depicted in FIG. 1). Second reaction chamber 330 may include one or more of a timer a mixer, a temperature sensor, and a heater element. Controller 360 may be configured to adjust the temperature in the reaction chamber (e.g., temperature set point or set points, temperature range, rate of change of temperature, etc.) to maintain conditions effective to react the chemical activation agent with the reduced graphene oxide. In some embodiments, second reaction chamber 330 may be fluidly coupled to a reservoir containing a chemical activation agent. Controller 360 may be configured to adjust a valve to control an amount and/or rate of materials delivered from the reservoir into second reaction chamber 330. In some embodiments, second reaction chamber 330 can be fluidly coupled to first reaction chamber 320 via a valve. Controller 360 may be configured to adjust the valve to control an amount and/or rate of reduced graphene oxide and particles delivered from first reaction chamber 320 into second reaction chamber 330.

Solvent applicator 340 may be configured via controller 360 to apply a solvent to a composition having reduced graphene oxide and particles to remove the particles from the composition (e.g., as in operation 140 depicted in FIG. 1). Solvent applicator 340 may be, for example, a timer, a mixer, a sprayer device, a coater device, and the like. In some embodiments, second reaction chamber 330 may be fluidly coupled to a reservoir containing a solvent that is configured to dissolve the particles in the composition. Controller 360 may be configured to adjust an amount and/or rate of the solvent applied to the composition. In some embodiments, solvent applicator 340 can be fluidly coupled to second reaction chamber 330 via a valve. Controller 360 may be configured to adjust the valve to control an amount and/or rate of reduced graphene oxide and particles delivered from second reaction chamber 330.

Heater device 342 may be configured via controller 360 to heat reduced graphene oxide under a reducing atmosphere (e.g., as in operation 150 depicted in FIG. 1). Heater device 342 may be, for example, an oven or a furnace. The heater device can be fluidly coupled to one or more reservoirs containing a reductive atmosphere. In some embodiments, the heating device can be fluidly coupled to a first reservoir having an inert gas (e.g., Ar) and a second reservoir having $H_2$ gas. Controller 360 may be configured to adjust valves to control an amount or flow rate of the inert gas and $H_2$ gas in the heating device.

Third reaction chamber 342 may be configured via controller 360 to heat a solution containing reduced graphene oxide, a first salt, and a second salt under solvothermal conditions (e.g., as in operation 170 depicted in FIG. 1). Third reaction chamber 342 may generally include a sealed chamber and a heating element. For example, third reaction chamber 342 may be an autoclave. Third reaction chamber 342 may include a temperature sensor and/or a timer. Controller 360 may be configured to adjust the temperature (e.g., temperature set point or set points, temperature range, rate of change of temperature, etc.) in the reaction chamber to maintain conditions effective to form a layered double-hydroxide on the reduced graphene oxide.

Figure 4A:
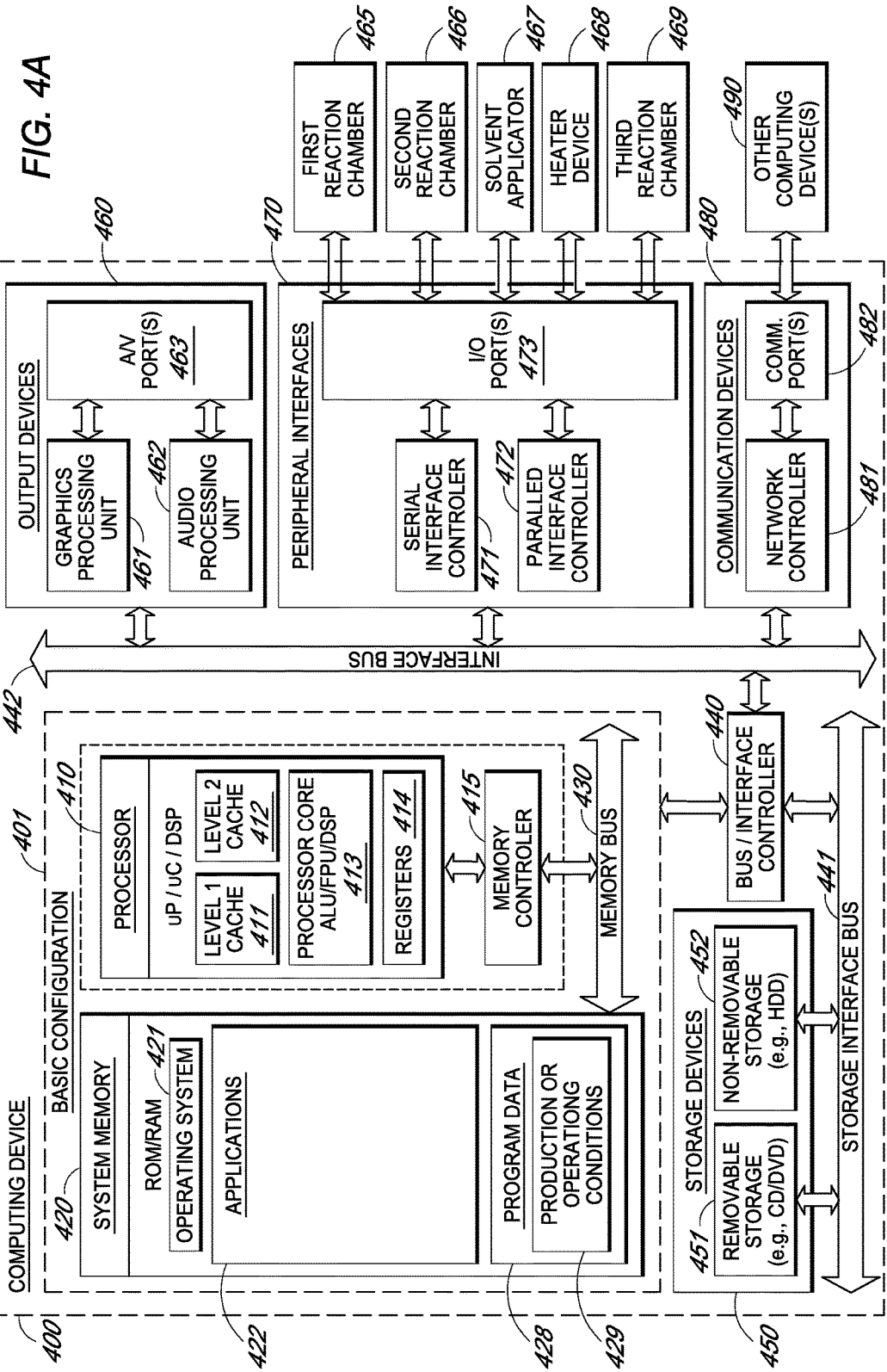
FIGS. 4A-B are a block diagram illustrating one example of a computing device that may be configured to control one or more operations in accordance with at least some examples of the present disclosure.
Figure 4B:
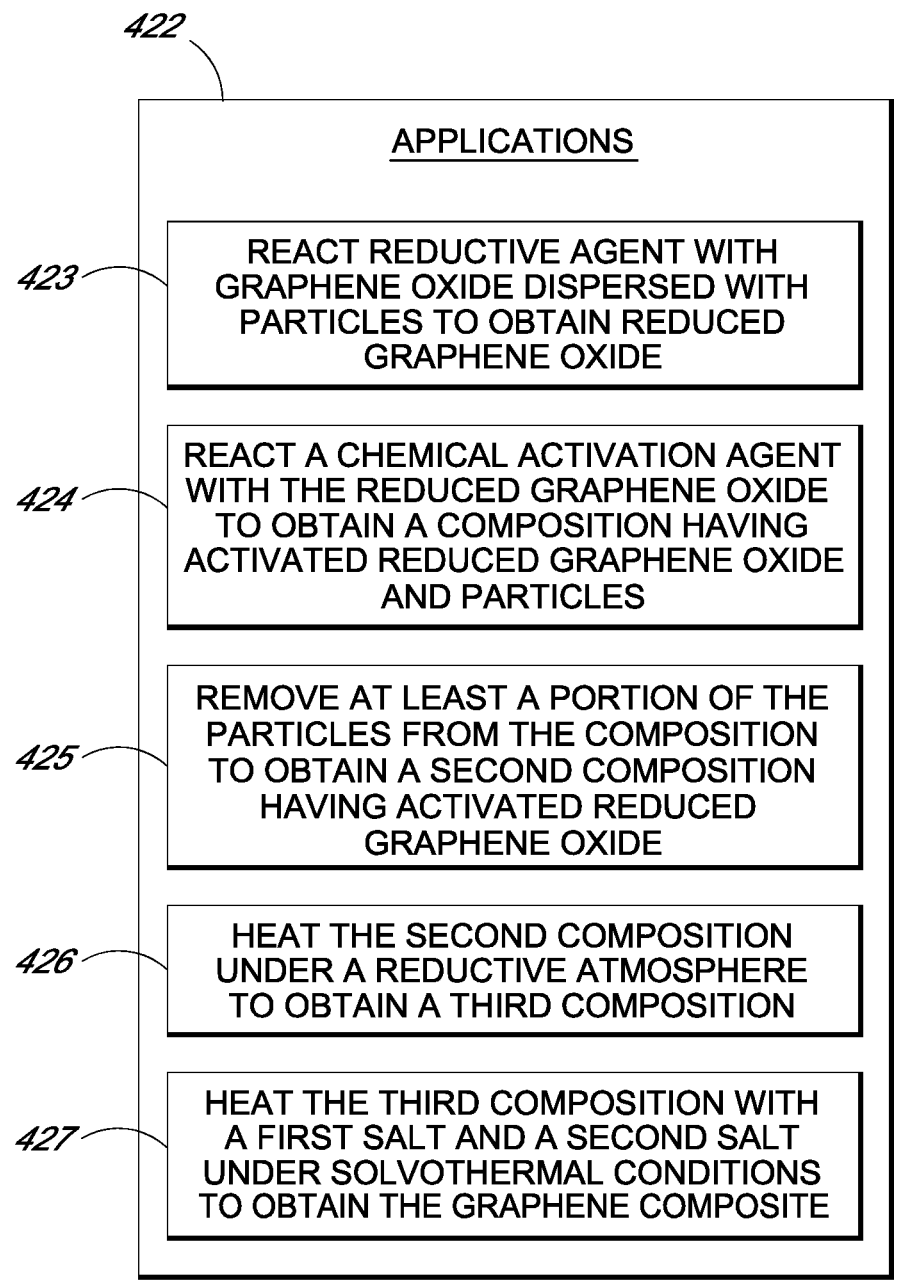

FIGS. 4A-B is a block diagram illustrating one example of a computing device that may be configured to control one or more operations in accordance with at least some examples of the present disclosure. For example, operations for the flow diagram of FIG. 1 may be performed by computing device 400. In a very basic configuration, computing device 400 typically includes one or more controllers or processors 410 and system memory 420. A memory bus 430 may be used for communicating between the processor 410 and the system memory 420.

Depending on the desired configuration, processor 410 may be of any type including but not limited to a microprocessor (µP), a microcontroller (µC), a digital signal processor (DSP), or any combination thereof. Processor 410 may include one or more levels of caching, such as a level one cache 411 and a level two cache 412, a processor core 413, and registers 214. The processor core 413 may include an arithmetic logic unit (ALU), a floating point unit (FPU), a digital signal processing core (DSP Core), or any combination thereof. A memory controller 415 may also be used with the processor 410, or in some implementations the memory controller 415 may be an internal part of the processor 410.

Depending on the desired configuration, the system memory 420 may be of any type including but not limited to volatile memory (such as RAM), non-volatile memory (such as ROM, flash memory, etc.), or any combination thereof. System memory 420 typically includes an operating system 421, one or more applications 422, and program data 426. As shown in FIG. 4B, applications 422 may include, for example, "React the reductive agent with graphene oxide dispersed with particles to obtain reduced graphene oxide" at application 423; "React a chemical activation agent with the reduced graphene oxide to obtain a composition having activated reduced graphene oxide and the particles" at application 424; "Remove at least a portion of the particles from the composition to obtain a second composition having activated reduced graphene oxide" at operation 425; "Heat the second composition under a reductive atmosphere to obtain a third composition" at operation 426; and "Heat the third composition with a first salt and a second salt under solvothermal conditions to obtain the graphene composite" at operation 427. These applications may correspond to operation 120, operation 130, operation 140, operation 150, and operation 170, respectively, as depicted in FIG. 1. Returning to FIG. 4A, program data 428 may include, for example, production data and/or operating conditions data 429 that may be used by one or more of applications 423-427.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 420, removable storage 451, and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 400. Any such computer storage media may be part of device 400.

Computing device 400 may also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. For example, in some embodiments, first reaction chamber 465, second reaction chamber 466, solvent applicator 467, heating device 468, and third reaction chamber 469 may be optionally connected via an I/O port and used to deposit nanostructures onto a substrate. An example communications device 480 includes a network controller 481, which may be arranged to facilitate communications with one or more other computing devices 490 over a network communication via one or more communication ports 482.

The communications connection is one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

EXAMPLES

Additional embodiments are disclosed in further detail in the following examples, which are not in any way intended to limit the scope of the claims.

Example 1

Figure 5:
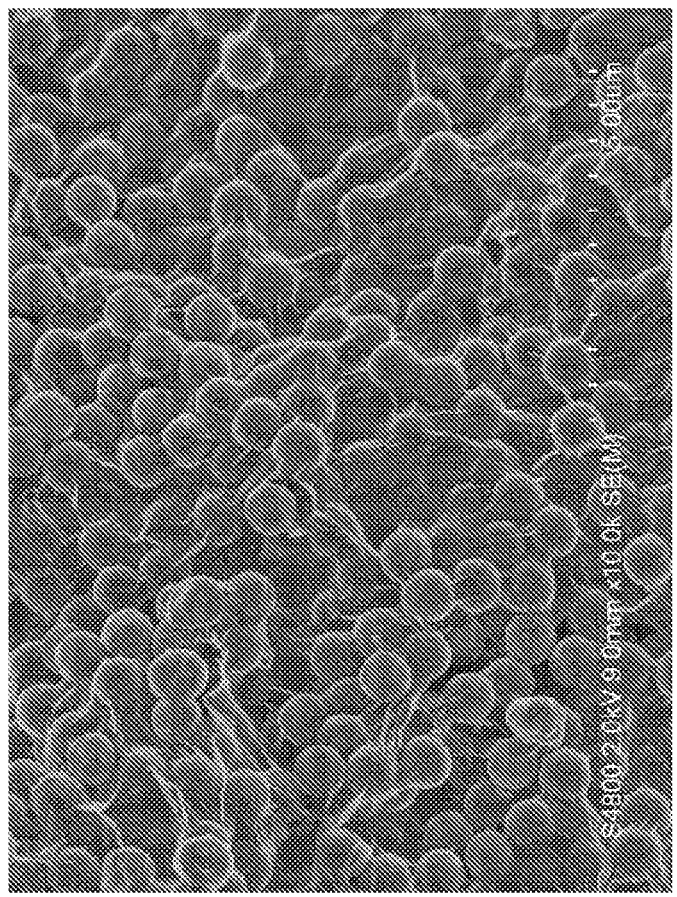
FIG. 5 shows a scanning electron microscopy (SEM) image of a composition having reducing graphene oxide and particles as prepared in Example 1.

100 mg of oxidized graphite and 200 mL of deionized water were added into a 500 mL beaker. The beaker was placed into an ultrasonicator to sonicate for about 6 hrs. 1000 mg of polypropylene polymer microspheres with negative charge (about 1 μm diameter) were added and ultrasonically dispersed for 30 min. 1 mL of concentrated ammonia water and 0.2 mL of hydrazine hydrate (35%) were added. The temperature was raised to 95° C. and kept for refluxing for 1 hour. The mixture was cooled down, filtered, washed with deionized water and ethanol successively, and dried under vacuum. FIG. 5 shows a scanning electron microscopy (SEM) image of the resulting composition having reducing graphene oxide and particles.

The formed polypropylene polymer microspheres coated with reduced graphene oxide were added into 200 mL of 6 mol/L NaOH solution and maintained at room temperature for about 24 hrs. It was then filtered, washed with deionized water to neutrality, and dried under vacuum. The polypropylene microspheres were then removed by washing the precipitates with toluene. The residual was washed with deionized water and dried under vacuum.

Figure 6:
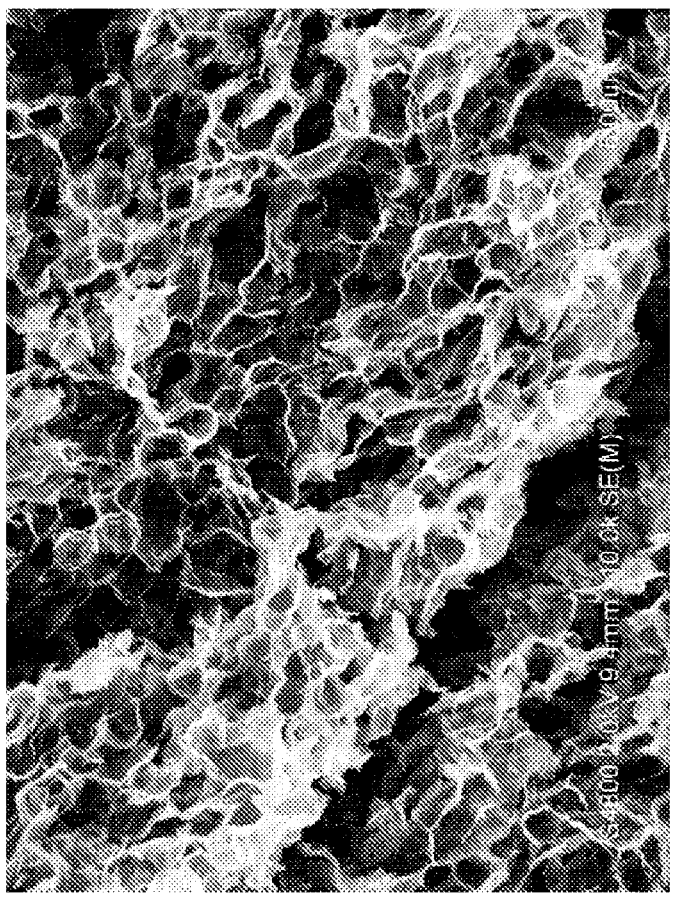
FIG. 6 shows a scanning electron microscopy (SEM) image of a composition having reduced graphene oxide and a layered double hydroxide as prepared in Example 1.

The formed 3D-microporous graphene was transferred into a tube furnace. The furnace was filled with $Ar/H_2$ mixed gas (3:1) and the graphene was thermally cracked for about 1 hour at a temperature as high as 800° C. 100 mg of the thoroughly-reduced 3D-microporous graphene was transferred into a high pressure reactor, into which 500 mg of $Ni(NO_3)_2$, 500 mg of $Al(NO_3)_3$, 200 mL of 95% ethanol and 800 mg of urea were added successively. The cover of the high pressure reactor was screwed tightly, and the temperature was raised to 130° C. and kept for about 12 hours. The reaction mixture was taken out, cooled down and filtered to obtain 800 mg of 3D-microporous reduced graphene oxide/Ni—Al layered double hydroxide. FIG. 6 shows a scanning electron microscopy (SEM) image of the resulting composition after the solvothermal treatment. The image shows that the microporous structure was maintained after removing the polypropylene particles.

Example 2

Figure 7:
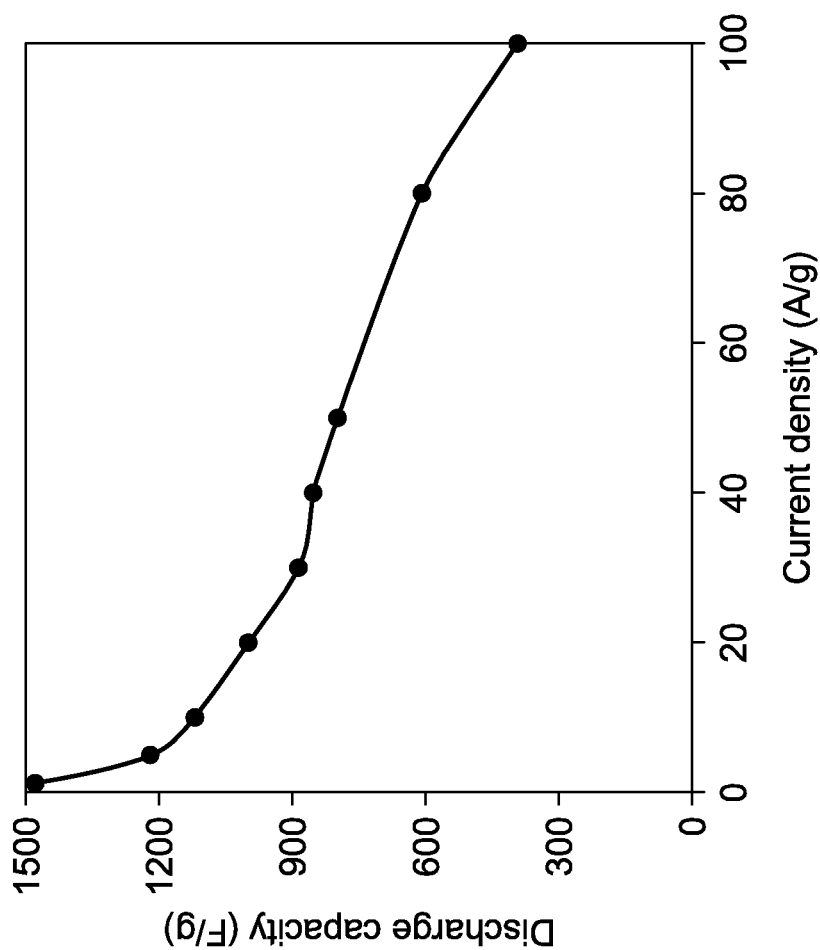
FIG. 7 is a graph showing the discharge capacitance (F/g) relative to charge density (A/g) for the supercapacitor prepared according to Example 2.

10 mg of the 3D-microporous composite from Example 1 was mixed well with 3 mg of acetylene black and 1.5 mg of polytetrafluoroethylene to form a paste. It was then coated onto the surface of Ni foam to form an electrode. A polypropylene membrane and 6 mol/L KOH solution as electrolyte were used to assemble a supercapacitor. Its electrochemical properties were tested at an electrochemical workstation. The experimental results of this invention are shown in FIG. 7. At 1 A/g current density, the discharge specific capacitance is 1476.28 F/g. When the current density was increased to 50 A/g, the specific capacitance could still reach about 800 F/g.

What is claimed is:

1. A method to make a graphene composite, the method comprising:
dispersing graphene oxide, particles, and a reductive agent in a first solution;
reacting the graphene oxide in the first solution with the reductive agent in the first solution to obtain a first composition comprising a reduced graphene oxide and the particles, wherein reacting the graphene oxide in the first solution with the reductive agent in the first solution to obtain the first composition comprises heating the first solution at a temperature in a range of about 90° C. to about 100° C. and wherein the first solution comprises alcohol;
reacting a chemical activation agent with the reduced graphene oxide in the first composition, wherein reacting the chemical activation agent with the reduced graphene oxide in the first composition comprises reacting the reduced graphene oxide with one or more of LiOH, NaOH, $Ca(OH)_2$, $Sr(OH)_2$, or $Ba(OH)_2$;

removing at least a portion of the particles from the first composition to obtain a second composition;

heating the second composition at a temperature in a range of about 800° C. to 1200° C. under a reductive atmosphere to obtain a third composition;

combining the third composition, a first salt comprising a divalent cation, and a second salt comprising a trivalent cation in a second solution, wherein the second solution comprises alcohol; and heating the second solution under solvothermal conditions to a temperature above a nominal boiling point of the second solution sufficient to obtain the graphene composite.

2. The method of claim 1, wherein removing at least the portion of the particles from the first composition comprises dissolving at least the portion of the particles in a solvent.

3. The method of claim 1, wherein removing at least the portion of the particles from the first composition comprises dissolving at least the portion of the particles in a solvent comprising tetrahydrofuran, toluene, or a mixture thereof.

4. The method of claim 1, wherein dispersing graphene oxide, the particles, and the reductive agent in the first solution comprises at least one of:

dispersing the particles, which comprise a polyolefin, a polystyrene, an acrylic, silica, or a mixture thereof, in the first solution;

dispersing the particles, which comprise polypropylene in the first solution;

dispersing the particles having an average largest dimension in a range of about 500 nm to about 1200 nm in the first solution;

dispersing the particles, which have a negative charge in the first solution;

dispersing the graphene oxide and the particles in the first solution at a weight ratio in a range of about 1:3 to about 1:10; or dispersing hydrazine hydrate, sodium borohydrate, or a mixture thereof in the first solution.

5. The method of claim 1, wherein heating the first solution at the temperature in the range of about 90° C. to about 100° C. comprises heating the first solution in a range of about 1 hour to about 6 hours.

6. The method of claim 1, wherein heating the second composition under the reductive atmosphere to obtain the third composition comprises heating the second composition under a reductive atmosphere comprising Ar, $H_2$, or a mixture thereof.

7. The method of claim 1, wherein combining the third composition, the first salt comprising the divalent cation, and the second salt comprising the trivalent cation in the second solution comprises at least one of:

combining the third composition, the second salt, and the first salt which comprises one or more of $Mg^{2+}$, $Zn^{2+}$, $Ni^{2+}$, $Cu^{2+}$, $Co^{2+}$, $Mn^{2+}$, $Ca^{2+}$, or $Fe^{2+}$;

combining the third composition, the second salt, and the first salt which comprises a nitrate or a sulfate;

combining the third composition, the first salt, and the second salt which comprises one or more of $Al^{3+}$, $Cr^+$, $Co^{3+}$, $Fe^{3+}$, $Mn^{3+}$, $Ga^{3+}$, $Ce^{3+}$, or $La^{3+}$;

combining the third composition, the first salt, and the second salt which comprises a nitrate or a sulfate;

combining the third composition, $Ni(NO_3)_2$, and $Al(NO_3)_3$; or combining the third composition, the first salt, the second salt, water, and the alcohol.

8. The method of claim 1, wherein heating the second solution under solvothermal conditions to obtain the graphene composite comprises heating the second solution at a temperature in a range of about 100° C. to about 200° C.

9. The method of claim 1, further comprising isolating the graphene composite which comprises the reduced graphene oxide and a layered double hydroxide.

10. The method of claim 9, further comprising combining the graphene composite with a binding medium and a conductive agent.

11. The method of claim 10, wherein combining the graphene composite with the binding medium and the conductive agent comprises combining the graphene composite, the conductive agent, and one or more of polytetrafluoroethylene, a plastic, stainless steel, glass, or a ceramic.

12. The method of claim 10, wherein combining the graphene composite with the binding medium and the conductive agent comprises combining the graphene composite, the binding medium, and one or more of acetylene black, polyaniline, polyoxyphenylene, polyphenylene sulfide, polythiophene, polyfuran, polypyrrole, polymethylpyrrole, polycarbozole, or polyazulene.

13. The method of claim 1, wherein heating the second composition under the reductive atmosphere to obtain the third composition comprises heating the second composition under a reductive atmosphere comprising an inert gas and $H_2$.

14. The method of claim 1, wherein heating the second solution under solvothermal conditions to obtain the graphene composite comprises heating the second solution at a temperature in a range of 151° C. to about 500° C.

15. The method of claim 1, wherein the second solution comprises about 95% by volume of the alcohol.

16. A method to make a graphene composite, the method comprising:

dispersing graphene oxide, particles, and a reductive agent in a first solution;

reacting the graphene oxide in the first solution with the reductive agent in the first solution to obtain a first composition comprising a reduced graphene oxide and the particles, wherein reacting the graphene oxide in the first solution with the reductive agent in the first solution to obtain the first composition comprises heating the first solution at a temperature in a range of about 90° C. to about 100° C. and wherein the first solution comprises alcohol;

reacting a chemical activation agent with the reduced graphene oxide in the first composition, wherein reacting the chemical activation agent with the reduced graphene oxide in the first composition comprises reacting the reduced graphene oxide with one or more of LiOH, NaOH, $Ca(OH)_2$, $Sr(OH)_2$, or $Ba(OH)_2$;

removing at least a portion of the particles from the first composition to obtain a second composition;

heating the second composition at a temperature in a range of about 800° C. to 1200° C. under a reductive atmosphere to obtain a third composition;

combining the third composition, a first salt comprising a divalent cation, and a second salt comprising a trivalent cation in a second solution such that a weight ratio of the reduced graphene oxide to a combined weight of the first salt and the second salt is in a range of about 1:100 to about 1:10; and heating the second solution under solvothermal conditions to a temperature above a nominal boiling point of the second solution sufficient to obtain the graphene composite.

17. A method to make a graphene composite, the method comprising:
dispersing graphene oxide, particles, and a reductive agent in a first solution;
reacting the graphene oxide in the first solution with the reductive agent in the first solution to obtain a first composition comprising a reduced graphene oxide and the particles, wherein reacting the graphene oxide in the first solution with the reductive agent in the first solution to obtain the first composition comprises heating the first solution at a temperature in a range of about 90° C. to about 100° C. and wherein the first solution comprises alcohol;
reacting a chemical activation agent with the reduced graphene oxide in the first composition, wherein reacting the chemical activation agent with the reduced graphene oxide in the first composition comprises reacting the reduced graphene oxide with one or more of LiOH, NaOH, $Ca(OH)_2$, $Sr(OH)_2$, or $Ba(OH)_2$;
removing at least a portion of the particles from the first composition to obtain a second composition;
heating the second composition at a temperature in a range of about 800° C. to 1200° C. under a reductive atmosphere to obtain a third composition;
combining the third composition, a first salt comprising a divalent cation, and a second salt comprising a trivalent cation in a second solution such that a molar ratio of the divalent cation to the trivalent cation is in a range of about 3:1 to about 1:3; and
heating the second solution under solvothermal conditions to a temperature above a nominal boiling point of the second solution sufficient to obtain the graphene composite.

* * * * *

UNITED STATES PATENT AND TRADEMARK OFFICE
CERTIFICATE OF CORRECTION

PATENT NO. : 9,887,046 B2
APPLICATION NO. : 14/758210
DATED : February 6, 2018
INVENTOR(S) : Li et al.

It is certified that error appears in the above-identified patent and that said Letters Patent is hereby corrected as shown below:

In Fig. 4A, Sheet 4 of 8, for Tag "468", Line 1, delete "HEATER DEVICE" and insert -- HEATING DEVICE --, therefor.

In Fig. 4A, Sheet 4 of 8, for Tag "472", Lines 1-3, delete "PARALLED INTERFACE CONTROLLER" and insert -- PARALLEL INTERFACE CONTROLLER --, therefor.

In Fig. 4A, Sheet 4 of 8, delete "uP / uC / DSP" and insert -- μP / μC / DSP --, therefor.

In Column 7, Line 44, delete "$Mn^{2-}$, $Ca^{2+}$, or $Fe^{2-}$." and insert -- $Mn^{2+}$, $Ca^{2+}$, or $Fe^{2+}$. --, therefor.

In Column 7, Line 47, delete "or La3-." and insert -- or La3+. --, therefor.

In Column 11, Line 9, delete "$M^{2-}$ includes" and insert -- $M^{2+}$ includes --, therefor.

In Column 11, Line 10, delete "$Cu^{2-}$," and insert -- $Cu^{2+}$, --, therefor.

In Column 11, Line 12, delete "or $La^{3-}$." and insert -- or $La^{3+}$. --, therefor.

In Column 14, Line 22, delete "chamber 342" and insert -- chamber 344 --, therefor.

In Column 14, Line 26, delete "chamber 342" and insert -- chamber 344 --, therefor.

In Column 14, Line 28, delete "chamber 342" and insert -- chamber 344 --, therefor.

In Column 14, Lines 28-29, delete "chamber 342" and insert -- chamber 344 --, therefor.

In Column 14, Line 51, delete "registers 214." and insert -- registers 414. --, therefor.

In Column 14, Line 55, delete "implementations the" and insert -- implementations, the --, therefor.

Signed and Sealed this
Twenty-second Day of May, 2018

Andrei Iancu
*Director of the United States Patent and Trademark Office*

CERTIFICATE OF CORRECTION (continued)
U.S. Pat. No. 9,887,046 B2

In Column 14, Line 63, delete "data 426." and insert -- data 428. --, therefor.

In Column 15, Line 46, delete "device 400." and insert -- computing device 400. --, therefor.

In Column 16, Line 34, delete "recitation no" and insert -- recitation, no --, therefor.

In Column 16, Line 56, delete "general such" and insert -- general, such --, therefor.

In Column 16, Line 63, delete "general such" and insert -- general, such --, therefor.

In Column 19, Line 62, in Claim 7, delete "$Cr^+$," and insert -- $Cr^{3+}$, --, therefor.